United States Patent
Scherb et al.

(10) Patent No.: US 10,320,454 B2
(45) Date of Patent: Jun. 11, 2019

(54) TECHNIQUE FOR PRECODER DETERMINATION

(71) Applicant: Telefonaktiebolaget LM Ericsson (publ), Stockholm (SE)

(72) Inventors: Ansgar Scherb, Lauf an der Pegnitz (DE); Bai Cheng Xu, Nuremberg (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/126,009

(22) PCT Filed: Mar. 14, 2014

(86) PCT No.: PCT/EP2014/055165
§ 371 (c)(1),
(2) Date: Sep. 14, 2016

(87) PCT Pub. No.: WO2015/135596
PCT Pub. Date: Sep. 17, 2015

(65) Prior Publication Data
US 2017/0222699 A1    Aug. 3, 2017

(51) Int. Cl.
*H04B 7/0456* (2017.01)
*H04B 7/06* (2006.01)
*H04W 24/08* (2009.01)

(52) U.S. Cl.
CPC ......... *H04B 7/0456* (2013.01); *H04B 7/0626* (2013.01); *H04B 7/0632* (2013.01);
(Continued)

(58) Field of Classification Search
CPC .. H04B 7/0456; H04B 7/0626; H04B 7/0632; H04B 7/0634; H04B 7/0639; H04W 24/08
See application file for complete search history.

(56) References Cited

U.S. PATENT DOCUMENTS

| 9,473,227 B2 | 10/2016 | Ko et al. |
| 9,584,205 B2 | 2/2017 | Moulsley et al. |

(Continued)

FOREIGN PATENT DOCUMENTS

| CN | 102656817 A | 9/2012 |
| WO | 2013112097 A1 | 8/2013 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.4.0, Sep. 1, 2013, pp. 1-182, 3GPP, France.

(Continued)

*Primary Examiner* — Christopher M Crutchfield
*Assistant Examiner* — Tito Q Pham
(74) *Attorney, Agent, or Firm* — Coats & Bennett, PLLC

(57) ABSTRACT

A technique for determining a precoder for a radio transmission via a channel (110) including at least two transmit antennas (106) is disclosed. As to a method aspect of the technique, channel state and optionally channel noise characteristics are measured by a measuring unit (122). Based on a result of the measurement, a subset of precoders is selected out of a codebook (116) including a plurality of precoders by a selecting and determining unit (120). The selecting and determining unit (120) further determines a precoder for precoding the transmission out of the subset.

20 Claims, 4 Drawing Sheets

(52) U.S. Cl.
CPC ......... *H04B 7/0634* (2013.01); *H04B 7/0639* (2013.01); *H04W 24/08* (2013.01)

(56) References Cited

U.S. PATENT DOCUMENTS

| | | | |
|---|---|---|---|
| 2008/0188190 A1 | 8/2008 | Prasad et al. | |
| 2012/0040622 A1* | 2/2012 | Ren | H04B 7/0626 455/67.11 |
| 2012/0196527 A1* | 8/2012 | Lagrange | H04L 45/70 455/9 |
| 2014/0029689 A1* | 1/2014 | Liu | H04B 7/0486 375/267 |
| 2014/0064393 A1* | 3/2014 | Sun | H04B 7/0478 375/267 |
| 2014/0072065 A1* | 3/2014 | Nammi | H04B 7/0626 375/267 |
| 2014/0247860 A1* | 9/2014 | Zhu | H04W 36/14 375/219 |

FOREIGN PATENT DOCUMENTS

| | | |
|---|---|---|
| WO | 2013179806 A1 | 12/2013 |
| WO | 2014035102 A1 | 3/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 12)", Technical Specification, 3GPP TS 36.211 V12.0.0, Dec. 1, 2013, pp. 1-120, 3GPP, France.

\* cited by examiner

200

300

TECHNIQUE FOR PRECODER DETERMINATION

TECHNICAL FIELD

The present disclosure relates to a technique for determining a precoder for a radio transmission. More specifically, and without limitation, a method and an apparatus for determining a precoder for a radio transmission via a channel including two or more transmit antennas is provided.

BACKGROUND

Data rates achievable in a mobile telecommunications network have been increased using base stations with two or more transmit antennas that provide one or multiple spatial streams to one or more mobile devices. The base station applies precoding weights to a signal to be transmitted on the different transmit antennas. For example, Long Term Evolution (LTE) introduced a further Transmission Mode, TM9, in Release 10, which supports up to 8 transmit antennas for a downlink channel with up to 8 spatial streams (which are also referred to as layers) from the base station to a User Equipment (UE).

The base station relies upon Channel State Information (CSI) reported by the UE for specifying a precoder, i.e., specifying the precoding weights for each transmit antenna and each layer. Codebook-based precoding uses a common codebook comprising a set of precoders. The codebook is known at both the transmitting base station and the receiving UE, so that one precoder is specified in the CSI report by reference to the codebook.

As the number of transmit antennas is increased, the size of the codebook (i.e., the number of codebook entries) increases. Furthermore, the size of each codebook entry (i.e., the number of precoding weights) increases with the number of layers. Signal processing for determining the precoder to be reported in the CSI requires memory resources and computational resources at the UE. The signal processing resources for a conventional implementation approximately scale with the size of the codebook and the size of the entries. For example in an LTE implementation supporting 8 transmit antennas and 2 layers, the codebook according to Table 7.2.4-2 in standard document 3GPP TS 36.213 (Version 11.4.0) includes 256 precoders, each precoder being represented by a matrix of dimension 8×2. In other words, 256 sets of precoding weights for the different transmit antennas have to be processed for each of the 2 layers. In the case of 4 transmit antennas, 16 sets of precoding weights for the different transmit antennas have to be processed for each of the 2 layers according to Table 6.3.4.2.3-2 in standard document 3GPP TS 36.211 (Version 12.0.0). The increase in codebook size by a factor of 16 for doubling the number of transmit antennas indicates a strong non-linear increase in resource consumption caused by increasing the number of transmit antennas.

SUMMARY

Accordingly, there is a need for a technique that determines a precoder more efficiently in at least some situations.

According to one aspect, a method of determining a precoder for a radio transmission via a channel including two or more transmit antennas is provided. The method comprises a step of measuring at least one of a channel state of the channel and a channel noise characteristic of the channel; a step of selecting, based on a result of the measurement, a subset of precoders out of a codebook including a plurality of precoders; and a step of determining a precoder for precoding the transmission out of the subset.

By dividing the precoder determination in the selecting step and the determining step resource requirements for determining the precoder can be reduced at least in some situations. At least some implementations of the technique avoid costly hypothesis testing over all codebook entries. For example, the selected subset can be significantly reduced compared to the codebook, so that the resource requirements of the determining step are reduced compared to a conventional precoder determination based on the entire codebook.

When the result of the measurement is indicative of channel noise, the result of the measurement may include a characteristic of the channel noise. The channel noise characteristic may include noise power of the channel noise, a covariance of the channel noise and/or at least some elements of a noise covariance matrix of the channel noise.

When the result of the measurement is indicative of the channel state, the result of the measurement may include at least some elements of a channel state matrix. E.g., each element of the channel state matrix may represent a combination of transmit antenna and receive antenna. Alternatively or in addition, each element may be a function of frequency (e.g., a subcarrier) and time (e.g., a symbol). E.g., the measuring step may be implemented by estimating a channel state.

Each entry in the codebook may correspond to, or may indicate, a different one of the plurality of precoders. The precoder may specify, or may be represented by, a set of precoding weights (also referred to as precoding coefficients). The set of precoding weights may include a precoding weight for each transmit antenna. If the channel provides multiple spatial streams (also referred to as layers), the set of precoding weights may include a precoding weight for each combination of transmit antenna and spatial stream of the channel. Alternatively or in addition, the precoder may be represented by a vector of precoding weights, or by a matrix of precoding weights. The matrix may include one column for each spatial stream. Each precoding weight may specify a phase shift, e.g., represented by a complex number of magnitude 1 or another predefined common magnitude. The number of precoding weights specified by each precoder may be proportional to the product of the number of transmit antennas and the number of spatial streams. The number of transmit antennas may be equal to 2, 4 or 8. The number of spatial streams may be equal to 1, 2, 3, 4, 5, 6, 7 or 8.

The plurality of precoders included in the codebook may be parameterized. For example, one or more precoders may be determined by a combination of a first parameter and a second parameter. Each combination of a first parameter and a second parameter may uniquely identify one precoder in the codebook. Alternatively or in addition, each precoder in the codebook may correspond to a unique first parameter and a unique second parameter.

The first parameter may specify the subset of precoders. The selecting step may specify the first parameter. Alternatively or in addition, the second parameter may specify one precoder in the subset. The determining step may specify the second parameter.

The subset, e.g., the first parameter, may be selected based on a first objective function. The first objective function may be a numerical approximation of signal power on the channel, Mutual Information (MI) on the channel, a channel capacity of the channel, a Signal-to-Noise Ratio (SNR)

and/or a Signal-to-Noise and Interference Ratio (SNIR). The first objective function may be a function of the result of the measurement and at least the first parameter. The result of the measurement may include at least one of the channel state and the channel noise. The subset, e.g., the first parameter, may be selected so as to maximize the first objective function. Maximizing the first objective function may be an approximation of maximizing MI on the channel, channel capacity, SNR and/or SNIR. The first objective function may ensure, e.g., with a predetermined level of confidence, that the precoder, which maximizes MI on the channel, channel capacity, SNR and/or SNIR, is included in the subset. The first objective function may be a quadratic function of the channel state.

The first objective function may be independent of a quantity indicative of the channel noise. The first objective function may depend on the measured quantity indicative of the channel state. E.g., the first objective function may depend on a relation between transmit antennas or groups of transmit antennas. E.g., the first objective function may depend on the channel states of different transmit antennas (which may also be referred to as transmit antenna correlation). The transmit antenna correlation may be quadratic in the channel state.

The first parameter may be a real number. The first parameter may correspond to a time delay between the different transmit antennas. The first objective function may include a sum over correlations that are phase-shifted according to the first parameter. The first objective function may be computed consistent with $g(\beta,R)=\Sigma_{m,n}\, r_{m,n}\, e^{j(m-n)\beta}$, wherein the first parameter is denoted by $\beta$, and wherein a relation, $R=(r_{m,n})$, between the transmit antennas m and n is denoted by $r_{m,n}$. The relation may depend on the measurement result.

Alternatively or in combination, a first objective function used for the selection may depend on a quantity indicative of both the channel state and the channel noise. The quantity may be representable by a matrix R. The first objective function may include a determinant. The determinant may be computed for a matrix that is quadratic in a candidate precoder W out of the codebook as a candidate for the subset and/or linear in the quantity R. The first objective function may be computed consistent with $g(W,R)=\det(I+W^H RW)$, wherein the candidate precoder is denoted by W, and wherein the relation between the transmit antennas is denoted by R and depends on the measurement result. Herein, a unity matrix is denoted by I.

The relation R may be computed according to $R=H^H H$, wherein the channel state is denoted by H. Alternatively or in addition, the relation R may be computed according to $R=H^H N^{-1} H$, wherein the channel state is denoted by H and noise covariance is denoted by N. Latter computation may, at least in certain situation, eliminate or reduce an influence of noise on the relation R and/or the selecting step.

A predefined number of the candidate precoders that correspond to the highest values of the first objective function may be selected for the subset. The selecting step may include sorting at least some precoders of the codebook according to an evaluation of the first objective function.

The first parameter may represent the subset of precoders. For example, the first parameter may indicate one precoder in the subset and the subset may be defined to include all precoders of the codebook that deviate from the indicated precoder up to a deviation limit.

The precoder may be determined based on the result of the measurement or another second result of the measurement. The precoder may be determined based on a second objective function. The second objective function may be different from the first objective function. The second objective function may be a function of the result of the measurement (or the second result) and the second parameter. The second objective function may be a numerical representation or estimation of MI on the channel, channel capacity, SNR and/or SNIR. The first objective function may be an approximation of the second objective function. The computational complexity for evaluating the second objective function may be greater than the computational complexity for evaluating the first objective function. The approximation may allow computing the first objective function numerically efficient compared to the second objective function. The first objective function may ensure, e.g., with a predetermined level of confidence, that the precoder maximizing the second objective function is included in the subset.

The precoder may be determined with a higher temporal resolution than the selection of the subset. The second objective function may depend on a plurality of measurements, e.g., measurements for individual Resource Blocks. The first objective function may depend on a single measurement in time.

The precoder may be determined by evaluating the second objective function for each of the precoders in the selected subset. The determining step may ignore precoders in the codebook that are not in the subset. The determined precoder may correspond to an extremum, e.g., a minimum or a maximum, of the evaluations.

The term objective function as used herein may encompass a metric, a merit function (e.g., to be maximized) or a cost function (e.g., to be minimized) for candidates of the precoders. The term objective function as used herein may encompass a function that allows assessing the suitability of a candidate precoder, e.g., given the measurement result. The first objective function may be a function that allows comparing and/or discriminating between different subsets. The second objective function may be a function that allows comparing and/or discriminating between different precoders in the subset.

The spatial streams of the channel may also be referred to as layers of spatial multiplexing. A number of layers or a rank of the channel may be equal to one. Each of the precoders may include a precoding vector. Alternatively or in addition, a number of layers or a rank of the channel may be equal to at least two. Each of the precoders may include a precoding matrix. The number of layers of the channel may be dynamically adapted to channel conditions, e.g., the rank of the channel.

The radio transmission may be a transmission from a base station to a mobile device. At least one of the measuring step, the selecting step and the determining step may be performed by the mobile device. The base station may include the two or more antennas. The precoding according to the determined precoder may be performed by the base station. For example, the base station may apply precoding weights according to the determined precoder for the different at least two transmit antennas.

The determined precoder may be reported from the mobile device to the base station. The determined precoder may be reported to the base station, e.g., by means of a Channel State Information (CSI) report. The measuring step may be based on reference signals. The reference signals may be received on the channel by the mobile device. The reference signals may be spread in space and time. The reference signals may include CSI Reference Signals (CSI-RS) from the base station.

The base station may use the codebook for codebook-based precoding, e.g., according to the determined precoder. The CSI report may include a Precoding Matrix Indicator (PMI), a Rank Indicator (RI) and/or a Precoding Type Indicator (PTI). The PMI, the RI and/or the PTI may indicate the determined precoder, e.g., by reference to the codebook.

The selected subset may include a fraction of the plurality of precoders included in the codebook. For example, the selected subset may include less than half of the plurality of precoders. The codebook is optionally restricted by the base station. An indicator of a restriction of the codebook may be received from the base station. The selecting step may select the subset of precoders out of the restricted codebook.

The channel noise may be indicative of noise covariance and/or noise power on the channel. The channel state may be indicative of a response function of the channel. The channel may be a Multiple Input Single Output (MISO) channel or a Multiple Input Multiple Output (MIMO) channel. The radio transmission via the MISO channel may include beamforming. Alternatively or in addition, the radio transmission via the MIMO channel may include spatial diversity and/or spatial multiplexing.

The precoder may increase, e.g., maximize, a Poynting vector of the radio transmission at the base station towards the mobile device. The selecting step may specify a coarse direction for the maximum Poynting vector of the radio transmission. The determining step may adjust the coarse direction, e.g., within a predetermined solid angle centered about the coarse direction.

According to another aspect, a computer program product is provided. The computer program product comprises program code portions for performing one or more of the steps of the method described herein when the computer program product is executed on one or more computing devices. The computer program product may be stored on a computer-readable recording medium such as a permanent or re-writable memory. The computer program product may also be provided for download via one or more computer networks, such as the Internet, a cellular telecommunications network, or a wireless or wired Local Area Network (LAN).

According to a further aspect, an apparatus for determining a precoder for a radio transmission via a channel including two or more transmit antennas is provided. The apparatus comprises a measuring unit adapted to measure at least one of a channel state of the channel and a channel noise characteristic of the channel; a selecting unit adapted to select, based on a result of the measurement, a subset of precoders out of a codebook including a plurality of precoders; and a determining unit adapted to determine a precoder for precoding the transmission out of the subset.

The apparatus may further be adapted to, or may further include one or more units adapted to, perform any one of the steps disclosed in the context of the method aspect.

BRIEF DESCRIPTION OF THE DRAWINGS

In the following, the present disclosure is described in more detail with reference to exemplary embodiments illustrated in the drawings, wherein FIG. 1 schematically illustrates a base station and a mobile device of a mobile telecommunications network.

DETAILED DESCRIPTION

In the following description, for purposes of explanation and not limitation, specific details are set forth, such as specific network environments, apparatus configurations to and transmission channels in order to provide a thorough understanding of the technique disclosed herein. It is apparent to one skilled in the art that the technique may be practiced in other embodiments that depart from these specific details. Moreover, while the following embodiments are primarily described in relation to Long Term Evolution (LTE), it is readily apparent that the technique may also be practiced in context with other mobile telecommunications networks including Universal Mobile Telecommunications System (UMTS) and Global System for Mobile Communications (GSM), as well as other wireless networks, e.g., a Wireless Local Area Network (W-LAN) according to the family of standards IEEE 802.11. Moreover, while embodiments are described for a linear array of transmit antennas, the technique is also applicable to two-dimensional arrays, such as 2×2, 2×4 or 4×4 antenna arrays.

Those skilled in the art will further appreciate that the methods, steps and functions explained herein may be implemented using individual hardware circuitry, using software functioning in conjunction with a programmed microprocessor or general purpose computer, using a Field-Programmable Gate Array (FPGA), an Application Specific Integrated Circuit (ASIC) and/or using one or more Digital Signal Processors (DSPs). It will also be appreciated that while the following embodiments are primarily described in the form of methods and apparatuses, the technique disclosed herein may also be embodied in a computer processor and a memory coupled to the processor, wherein the memory stores one or more programs that perform the steps discussed herein when executed by the processor.

Figure 1:
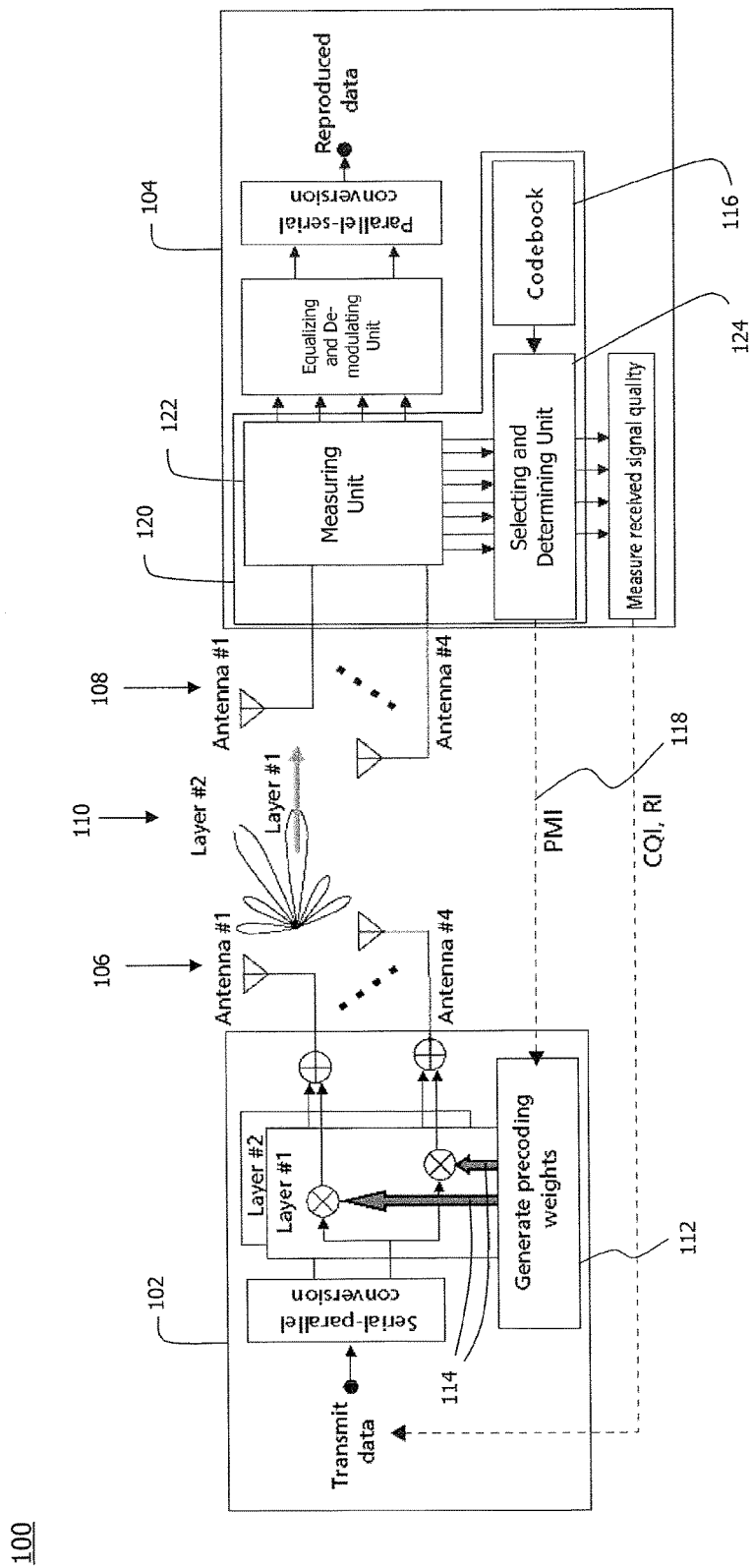

FIG. 1 schematically illustrates a mobile telecommunications system including a base station 102 and a mobile device 104. In the exemplary scenario shown in FIG. 1, the base station 102 includes 4 transmit antennas 106 and the mobile device 104 includes 4 receive antennas 108 for a downlink transmission on a channel 110 including two spatial layers. For a closed-loop Single User Multiple Input Multiple Output (SU-MIMO) transmission on the downlink channel 110, precoding is applied to the data carried on a Physical Downlink Shared Channel (PDSCH) in order to increase the received Signal-to-Interference plus Noise power Ratio (SINR).

The basis station includes a unit 112 for generating precoding weights 114. For each transmission layer (also referred to as spatial stream), precoding weights 114 are applied to the transmit antennas 106 based on Channel State Information (CSI) reported by the mobile device 104. A set of precoding weights is also referred to as a precoder.

An ideal precoder can be computed, e.g., from eigenvectors of a covariance matrix, $H^H H$, of a channel state represented by the matrix H. Herein, the superscript "H" indicates transposition and complex conjugation. However, reporting the eigenvectors from the mobile device 104 to the base station 102 is not practical in terms of the required control signaling overhead. Long Term Evolution (LTE) introduced in Release 8 codebook-based precoding, in which the best precoder among a plurality of predetermined precoders is reported from the mobile device 104 to the base station 102. The plurality of predetermined precoders is collectively referred to as a codebook 116. To minimize the overhead for control signaling, the CSI includes a Precoding Matrix Indicator (PMI) 118. The PMI 118 is an index that identifies the precoder in the codebook 116. The codebook 116 is also known to the unit 112 in the base station 104 applying the precoding weights 114 according to the PMI 118.

The mobile device 104 includes an apparatus 120 for precoder determination. The apparatus includes a measuring unit 122 and a selecting and determining unit 124. Based on an estimation for the channel state H and, optionally, channel noise of the channel 110 provided by the measuring unit 122, the selecting and determining unit 124 specifies the PMI 118.

Figure 2:
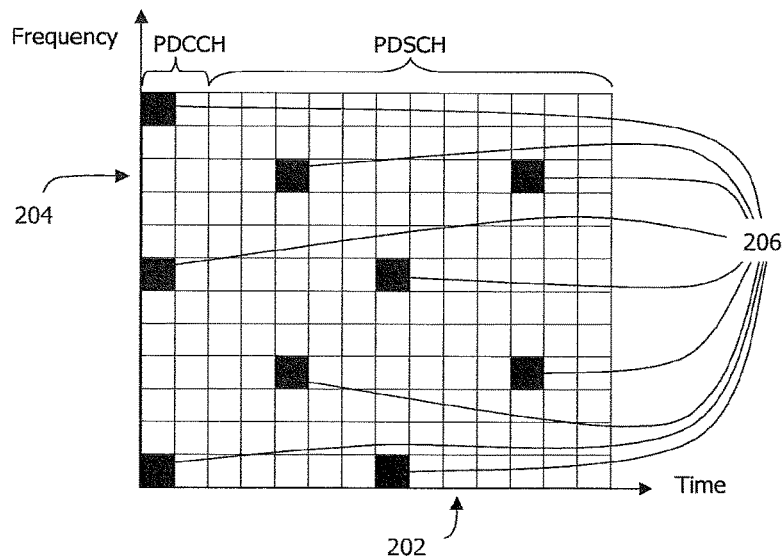
FIG. 2 schematically illustrates reference signals, particularly Channel State Information-Reference Signals, CSI-RS, for measuring a channel state and channel noise of a channel between the base station and the mobile device of FIG. 1.

Frequency-selective precoding is adapted in LTE since Release 8. FIG. 2 shows a Resource Block (RB) 200 with time on the horizontal axis and frequency on the vertical axis. The RB 200 encompasses on the time axis one subframe, i.e., one millisecond. The subframe includes 14 Orthogonal Frequency Division Multiplexing (OFDM) symbols (one of which is shown at reference sign 202). The RB 200 encompasses 12 subcarriers (one of which is shown at reference sign 204) on the frequency axis. Each OFDM symbol within the RB 200 includes 12 Resource Elements (REs). The RB 200 thus includes 12×14 REs (each of which is indicated by a square in the RB 200 shown in FIG. 2).

The channel 110 includes a Physical Downlink Control Channel (PDCCH) and the PDSCH. The first two symbols of the RB 200 are allocated to the PDCCH. The further 12 symbols are allocated to the PDSCH. The basis station 102 notifies the mobile device 104 of the precoding weight information actually used for the PDSCH through the PDCCH. The mobile device 104 uses the precoding weight information for demodulation.

Reference Signals 206 are transmitted by the base station 102 in REs distributed in the RB 200 according to a predetermined pattern. The measuring unit 122 estimates a channel state and channel noise by receiving the predetermined reference signals 206.

While the mobile telecommunications network 100 has been exemplarily described with reference to FIG. 1 for a closed-loop SU-MIMO transmission with rank 2 via a 4×4 MIMO channel 110, the technique is also applicable to a 2×2 MIMO channel or a Multiple Input Single Output (MISO) channel.

Figure 3:
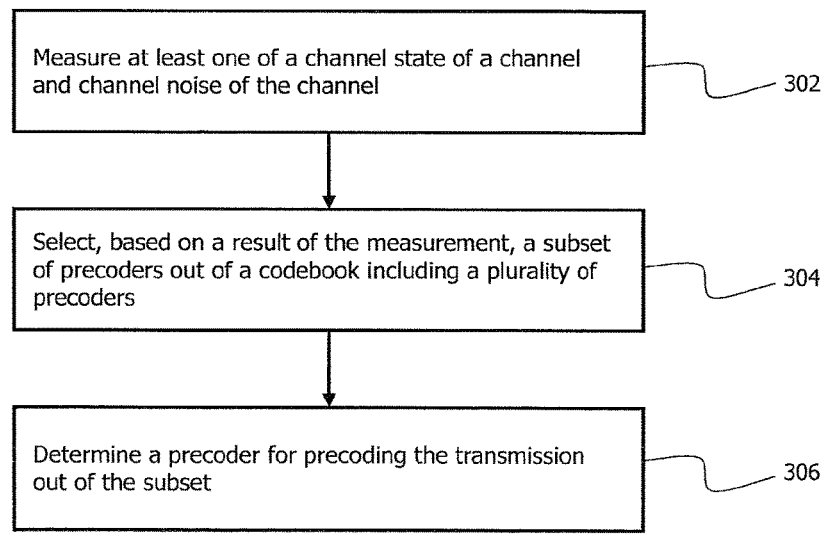
FIG. 3 shows a flowchart for a method of determining a precoder for a radio transmission between the base station and the mobile device of FIG. 1.

FIG. 3 shows a flowchart for a method 300 of determining a precoder for a radio transmission via a channel including two or more transmit antennas. The method 300 may be performed at the mobile device 104. The mobile device 104 may receive the channel 110 from the transmit antennas 106.

The method comprises a step 302 of measuring a channel state of the channel and, optionally, channel noise of the channel. Based on a result of the measurement, a subset of two or more precoders out of a codebook including a plurality of precoders is selected in a step 304. A precoder for precoding the transmission is determined in a step 306 out of the selected subset.

The step 302 may be performed by the measuring unit 122. The steps 304 and 306 may be performed by the selecting and determining unit 124. The unit 124 further reports the PMI 118 to the base station 102 of the radio transmission. Optionally, a further functional unit 124 determines a Channel Quality Indicator (CQI) and Rank Indication (RI), e.g., for rank adaption according to channel conditions. In this case, the CSI report to the base station 102 includes the PMI 118, the CQI and the RI.

Figure 4:
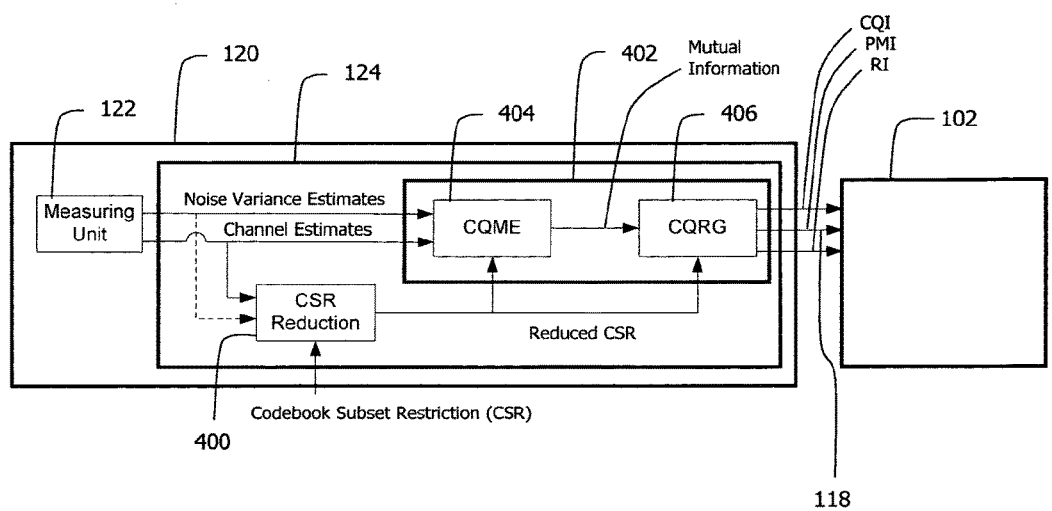
FIG. 4 schematically illustrates a block diagram of an apparatus for determining a precoder in the mobile device of FIG. 1.

FIG. 4 schematically illustrates a block diagram of an embodiment for the apparatus 120. The apparatus 120 includes a selecting unit 400 and a determining unit 402. The determining unit 402 is also referred to as core signal processing for precoder determination or Channel Quality Indicator Entity (CQIE). The determining unit 402 is downstream of the selecting unit 400. The selecting unit 400 is adapted to select, based on a results of the measurement provided by the measuring unit 122, a subset to of precoders out of the codebook 116 according to the step 304. The determining unit 402 is adapted to determine the precoder (e.g., to be used for precoding the transmission) out of the selected subset according to the step 306. The PMI 118 corresponding to the determined precoder is reported to the base station 102 by the apparatus 120.

The selecting unit 400 reduces the complexity of signal processing downstream of the selecting unit 400. E.g., the signal processing effort in the determining unit 402 is reduced. The selecting unit 400 reduces entries in a Codebook Subset Restriction (CSR) bit field in front of the core signal processing for precoder determination according to the selecting step 304. The complexity for the signal processing according to the selecting step 304 performed by the selecting unit 400 is more than compensated by the reduction of complexity for the signal processing according to the determining step 306 downstream of the selecting unit 400.

Optionally, the selecting unit 400 accounts for an additional restriction signaled by the base station 102. In an LTE implementation, a codebook subset restriction by the base station 102 is supported in Transmission Modes (TM) 3, 4, 5, 6, 8 and 9, if the mobile device 104 is configured to include the PMI 118 and/or the RI in the CSI report.

The selecting unit 400 evaluates a first objective function. The selected subset of precoders maximizes the first objective function. In one embodiment for the selecting unit 400, the subset is selected based on the channel state provided by the measuring unit 122. In an advanced embodiment of the selecting unit 400, the subset is selected based on the channel state and the channel noise provided by the measuring unit 122 (which is indicated by a dotted arrow in FIG. 1). The evaluation of the first objective function is a substep of the selecting step 304.

In the embodiment for the determining unit 402 shown in FIG. 4, the determining unit 402 includes a Channel Quality Metric Estimator (CQME) 404 and a Channel Quality Report Generator (CQRG) 406. The CQME 404 evaluates (e.g., by numerically computation) a second objective function based on the channel state and the channel noise provided by the measuring unit 122. The evaluation of the second objective function is a substep of the determining step 306.

The computational complexity for evaluating the second objective function is significantly greater than the computational complexity for evaluating the first objective function. Typically, the computational complexity of the second objective function is at least 2 times (e.g., about 4 times or about 10 times) the computational complexity of the first objective function.

The CQME 404 evaluates the second objective function for each precoder in the subset (e.g., represented by the reduced CSR) given the measurement provided by the measuring unit 122. The second objective function estimates a metric for the corresponding one of the precoders in the subset. The CQRG 406 determines, based on the metrics provided by the CQME 404, which precoder out of the subset is determined according to the step 306. The determining unit 402 evaluates and compares the second objective function only for those precoders included in the subset selected by the selecting unit 400.

The second objective function yields a metric that is more accurate than a metric provided by the first objective function. E.g., the metric provided by the first objective function is accurate enough for distinguishing between different subset in the codebook. The metric provided by the second objective function is accurate enough for distinguishing between different precoders in the subset. The metric provided by the first objective function is not accurate enough for distinguishing between different precoders in the subset. In one embodiment for the CQME 404, the second objective function estimates the mutual information on the channel 110. In a variant of the embodiment, the second objective function estimates the SNIR of the channel 110.

Figure 5A:
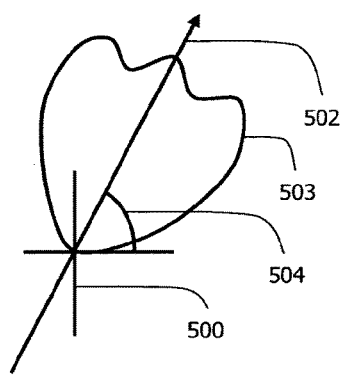
FIG. 5A schematically illustrate a first parameter of a codebook used for the precoding determination.
Figure 5B:
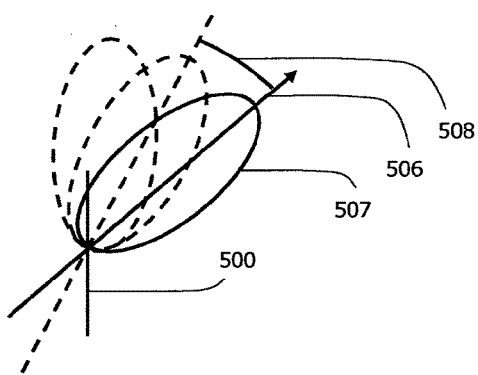
FIG. 5B schematically illustrate a second parameter of a codebook used for the precoding determination.

A first use case of the technique is described with reference to FIGS. 5A and 5B. Each of FIGS. 5A and 5B schematically illustrates an azimuthal cross-section of an emission characteristic for an exemplary array of the transmit antennas 106 in a plane 500.

Each subset corresponds to a coarse direction 502 of emitted power centered about a first angle 504 relative to a normal of the plane 500. The emission characteristic 503 results from a hypothetical superposition of the precoders in the subset. For the exemplary array of transmit antennas 106 underlying FIG. 5A, the selection step 304 specifies the coarse direction 502.

The determining step 306 specifies an emission direction 506 by determining one precoder out of the subset. As schematically illustrated in FIG. 5B, the determined precoder corresponds to a narrower emission characteristic 507 centered about the emission direction 506. The emission direction 506 includes a second angle 508 with the coarse direction 502. The technical effect schematically illustrated in FIGS. 5A and 5B for the selecting step 304 and the determining 306, respectively, shows that the selecting step 306 corresponds to selecting a coarse direction 502 according to the first angle 504, which is refined or adjusted in the determining step 306 according to the second angle 508 resulting in the emission direction 506.

The codebook 116 for an LTE implementation using 2 transmit antennas or 4 transmit antennas 106 is specified in standard document 3GPP TS 36.211 (Version 12.0.0) in Sect. 6.3.4.2.3. Loc. cit., Table 6.3.4.2.3-1 specifies the codebook 116 for 2 transmit antennas 106, and Table 6.3.4.2.3-2 specifies the codebook for 4 transmit antennas 106.

An exemplary LTE implementation according to standard document 3GPP TS 36.213 (Version 11.4.0), Sect. 7.2.4 is described. Loc. cit., Tables 7.2.4-1 to 7.2.4-8 specify codebooks 116 for 8 transmit antennas 106, wherein the channel 110 provides 1 to 8 layers, respectively. For example, the number of precoders in the codebook is 16×16=256 according to Table 7.2.4-1. Each precoder specifies 8 precoding weights, i.e., one precoding weight for each transmit antenna. For two or more layers on the channel 110, each precoder specifies 8 precoding weights, $w=[w_0, \ldots, w_7]^T$, for each of the layers.

The precoding vectors, w, to be considered for PMI reporting when CSI-RS is transmitted over 8 transmit antennas 106 are composed in the following way. For each layer, a complex vector $w_{n,m}$ of length 8 is given by $$w_{n,m} = \begin{bmatrix} v_m \\ \varphi_n v_m \end{bmatrix}, \quad (1)$$

A first index m of the codebook ranges from 0 to 31. The complex column vector $v_m$ of length 4 in Eq. (1) is defined as $$v_m = [1, e^{j\beta}, e^{j2\beta}, e^{j3\beta}]^T, \quad (2)$$

wherein a first phase angle $$\beta = \frac{2\pi m}{32}$$

is an alternative representation of the first parameter.

A second index n of the codebook ranges from 0 to 3. The phase factor $\varphi_n$ is defined as $$\varphi_n \in \{1, e^{j\alpha}, e^{j2\alpha}, e^{j3\alpha}\}, \quad (3)$$

wherein a second phase angle $\alpha = 2\pi n/4$ is an alternative representation of the second parameter.

Figure 6:
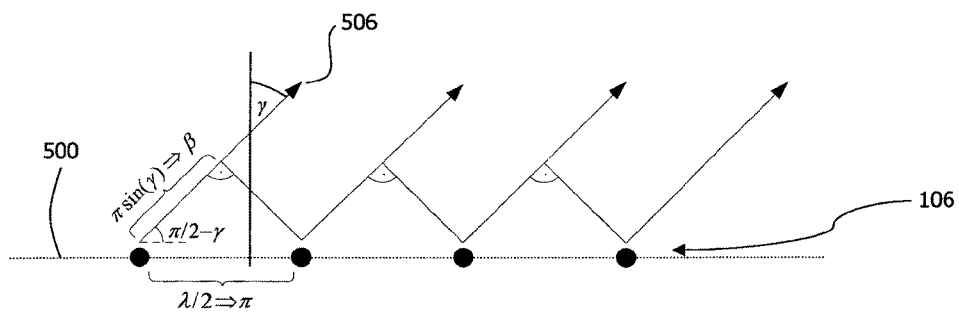
FIG. 6 schematically illustrates a linear array of 4 transmit antennas.

The precoding vector is fully determined by two parameters, the phase angles α and β. A second use case of the technique is described with reference to FIGS. 6 and 7. A physical interpretation of the first phase angle β is illustrated in FIG. 6 for a linear array 500 of the transmit antennas 106 spaced apart by a distance λ/2 between two adjacent antennas 106. For clarity, 4 transmit antennas 106 are shown in FIG. 6. The first partition, $v_m$, of the precoding vector, $w_{n,m}$, is sequentially associated to the transmit antennas 106 shown in FIG. 6. An emission angle γ relative to the normal direction of the linear array 500 is directly related to the first phase angle β. Hence, the first phase angle β specifies the emission direction 506.

Figure 7:
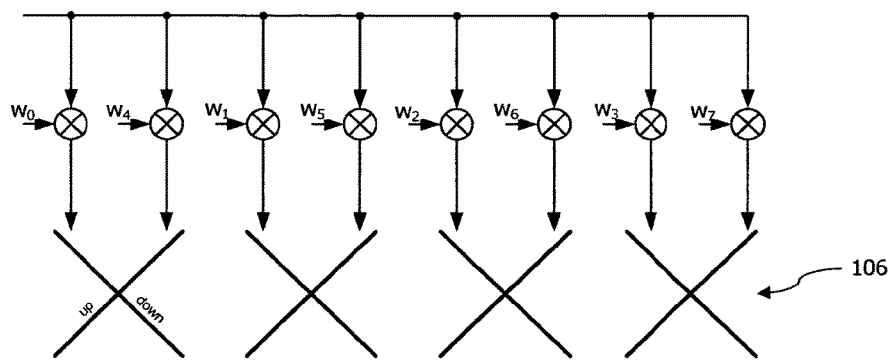
FIG. 7 schematically illustrates an arrangement of 4 pairs of cross-polarized transmit antennas.

FIG. 7 shows a linear array of 4 pairs of cross-polarized transmit antennas 106. FIG. 7 shows the plane including the transmit antennas 106, i.e., antenna dipoles are parallel to the plane of the drawing sheet. The 4 transmit antennas with cross-polarization direction "up" are sequentially associated to the first partition, $v_m$, of the precoding vector, $w_{n,m}$. The second partition, $\varphi_n v_m$, of the precoding vector, $w_{n,m}$, is sequentially associated to the cross-polarization direction "down". Consequentially, the emission direction is specified by the first phase angle β. The polarization directions "up" and "down" have the same emission characteristic in the azimuthal cross-section shown in FIG. 6. The phase angle α controls the combination of the two cross-polarization components.

For an LTE implementation with 8 transmit antennas 106 and two layers, the codebook 116 includes 256 different precoders according to 3GPP TS 36.213 (Version 11.4.0), Table 7.2.4-2. Each precoder specifies two precoding vectors $w_{n,m}$, i.e., one precoding vector for each layer. The two precoding vectors can be represented as columns of one precoding matrix. Hence, each precoder is representable by one precoding matrix $W(i_1, i_2)$.

The codebook entries, i.e., the plurality of precoders in the codebook 116, are parameterized by the two indices $i_1$ and $i_2$, each index ranging from 0 to 15. For periodic CSI reporting on a Physical Uplink Control Channel (PUCCH), the two indices are sequentially reported to the base station 102, e.g., within different subframes 200.

The codebook 116 obeys the following structure according to afore-mentioned Tables 7.2.4-1 and 7.2.4-2 for transmission ranks 1 and 2, respectively. The index $i_1$ determines the coarse angle of radio emission, e.g., in terms of the first phase angle $\beta$. For each given index $i_1$, the index $i_2$ spans codebook entries for fine adjustment of the phase angles $\alpha$ and $\beta$. The variation of $\beta$ about $\beta_{mean}$ for a given index $i_1$ is within a narrow range $\pm\Delta\beta$. Below table includes the range $\pm\Delta\beta$ of the first phase angle $\beta$ for different $i_2$ and a given index $i_1$.

| $i_1$ | $\beta_{mean}$ | $\pm\Delta\beta$ | $i_1$ | $\beta_{mean}$ | $\pm\Delta\beta$ |
|---|---|---|---|---|---|
| 0 | $2\pi \cdot \frac{3}{64}$ | $2\pi \cdot \frac{3}{64}$ | 8 | $2\pi \cdot \frac{3}{64}$ | $2\pi \cdot \frac{3}{64}$ |
| 1 | $2\pi \cdot \frac{7}{64}$ | $2\pi \cdot \frac{3}{64}$ | 9 | $2\pi \cdot \frac{39}{64}$ | $2\pi \cdot \frac{3}{64}$ |
| 2 | $2\pi \cdot \frac{11}{64}$ | $2\pi \cdot \frac{3}{64}$ | 10 | $2\pi \cdot \frac{43}{64}$ | $2\pi \cdot \frac{3}{64}$ |
| 3 | $2\pi \cdot \frac{15}{64}$ | $2\pi \cdot \frac{3}{64}$ | 11 | $2\pi \cdot \frac{47}{64}$ | $2\pi \cdot \frac{3}{64}$ |
| 4 | $2\pi \cdot \frac{19}{64}$ | $2\pi \cdot \frac{3}{64}$ | 12 | $2\pi \cdot \frac{51}{64}$ | $2\pi \cdot \frac{3}{64}$ |
| 5 | $2\pi \cdot \frac{23}{64}$ | $2\pi \cdot \frac{3}{64}$ | 13 | $2\pi \cdot \frac{55}{64}$ | $2\pi \cdot \frac{3}{64}$ |
| 6 | $2\pi \cdot \frac{27}{64}$ | $2\pi \cdot \frac{3}{64}$ | 14 | $2\pi \cdot \frac{59}{64}$ | $2\pi \cdot \frac{3}{64}$ |
| 7 | $2\pi \cdot \frac{31}{64}$ | $2\pi \cdot \frac{3}{64}$ | 15 | $2\pi \cdot \frac{63}{64}$ | $2\pi \cdot \frac{3}{64}$ |

The first and second uses cases are combined in an embodiment. According to the parameterization structure of the codebook 116, the first index $i_1$ specifies a coarse beam direction (as schematically illustrated in FIG. 5A at reference sign 502) and the second index $i_2$ allows for fine adjustment of $\alpha$ and (as schematically illustrated in FIG. 5B at reference sign 508) for $\beta$ about $\beta_{mean}$. The selection 304 of the subset specifies $i_1$. The determination 306 (which is preferably dealt in the CQIE 402 only) specifies the index $i_2$. As compared to a conventional implementation performing the precoder determination by evaluating each of the 256 different possible precoders each including one precoding vector per transmission rank, the embodiment reduces the number of evaluations to 16. The technique thus achieves a level of computational complexity for 8 transmit antennas 106, which is similar to a conventional precoder determination for 4 transmit antennas.

Embodiments for the first objective function are described below. The embodiments for the first objective function can be combined with afore-mentioned embodiments for the second objection function. While below considerations provide a clear understanding of the first objective function to the skilled person, steps described below, e.g., for justifying examples of the first objective function, are not essential for an implementation of the first objective function. For example, a result of the consideration can be implemented, e.g., using a FPGA, a program executed on an Advanced RISC Machine (ARM) processor and/or an Embedded Vector Processor (EVP).

A first embodiment for the first objective function relates to a single-layer transmission on the channel 110. The CSI-RSs, s(k), are received by the mobile device 104 at Resource Element k. A time index l for the OFDM symbol may be omitted, since the CSI-RSs have only one allocation in time direction per subframe 200.

For 8 transmit antennas 106 and $N_{Rx}$ receive antennas 108, the CSI-RSs s(k) are received over the $N_{Rx} \times 8$ MIMO channel 110, the channel state of which is represented by H(k), and corrupted by noise n(k). The UE observation is given as $$y(k) = H(k)w_{n,m}s(k) + n(k) \quad (4)$$
$$= H_1(k)v_m s(k) + H_2(k)\varphi_n v_m s(k) + n(k)$$

In the first embodiment, an objective of the first objective function is to find the first phase angle $\beta$ such that the signal energy is maximized (irrespectively of the choice of $\varphi_n$), i.e.

$$\beta_{max} = \arg\max_\beta E\{\|H_1(k)v_m s(k) + H_2(k)\varphi_n v_m s(k)\|_2^2\} \quad (5)$$
$$= \arg\max_\beta v_m^H \underbrace{E\{H_1^H(k)H_1(k) + H_2^H(k)H_2(k)\}}_{R} v_m$$

The intermediate matrix R of dimension 4×4 can be estimated by $$R = \sum_{k=0}^{N_{RB}^{DL}-1} H_1^H(k)H_1(k) + H_2^H(k)H_2(k), \quad (6)$$

wherein the numerical complexity includes a number of $(4+3+2+1) \cdot N_{RB}^{DL} \cdot 2$ complex multiplications and a number of $(4+3+2+1) \cdot (N_{RB}^{DL}-1) \cdot 2$ complex additions. The intermediate matrix R may be interpreted as a relation between the 4 pairs of transmit antennas, e.g., a transmit antenna correlation that is averaged over the different polarizations.

Inserting Eq. (2) into Eq. (5), the first objective function can be rewritten as $$g(\beta) = \sum_{m=0}^{N-1} \sum_{n=0}^{N-1} r_{m,n} e^{j(m-n)\beta} \quad (7)$$
$$= \sum_{m=0}^{N-1} r_{m,m} + \sum_{v=1}^{N-1} \sum_{m=0}^{N-1-v} r_{m,m+v} e^{jv\beta} + r_{m,m+v}^* e^{-jv\beta}$$
$$= \sum_{m=0}^{N-1} r_{m,m} +$$
$$2 \sum_{v=1}^{N-1} \left( \cos(v\beta) \underbrace{\sum_{m=0}^{N-1-v} \Re\{r_{m,m+v}\}}_{\bar{r}'_v} - \sin(v\beta) \underbrace{\sum_{m=0}^{N-1-v} \Im\{r_{m,m+v}\}}_{\bar{r}''_v} \right)$$

The numerical effort for summing up $\bar{r}'_v$ and $\bar{r}''_v$ includes $2 \times (3+2+1)$ real additions.

Two variants of the first embodiment that approximate $\beta_{max}$ are disclosed. The first variant has the lower numerical complexity compared to the second variant at the cost of less accuracy.

The first variant is described. At $\beta=\beta_{max}$, the derivative of $g(\beta)$ with respect to $\beta$ vanishes:

$$\frac{\partial g(\beta)}{\partial \beta} = \sum_{v=1}^{N-1} -v\bar{r}'_v \sin(v\beta) + v\bar{r}''_v \cos(v\beta) = 0. \quad (8)$$

For N transmit antennas 106, $N \leq 4$, a closed-form solution of Eq. (8) may be found, e.g., using Chebyshev polynomials. In general and/or for numerical efficiency, the derivative of the first objective function is approximated by neglecting the higher order terms $v>1$ of the sum. Hence, Eq. (8) becomes $$\frac{\partial g(\beta)}{\partial \beta} \approx -\bar{r}'_1 \sin(\beta) + \bar{r}''_1 \cos(\beta) = 0 \quad (9)$$

An approximation of $\beta_{max}$ is obtained by calculating $$\beta_{max} = \arctan\left(\frac{\bar{r}''_1}{\bar{r}'_1}\right) \quad (10)$$

Eq. (10) specifies the first index $i_1$ according to the first variant in the selecting step 304. The first index is specified, e.g., by rounding. For example, the entry in above table for $\beta_{mean}$ that is closest to $\beta_{max}$ specifies the first index $i_1$.

The numerical complexity of the first variant is summarized in below table.

| Function | Multiplications | Additions | Specific Operations |
|---|---|---|---|
| Covariance matrix estimation | $3 \times N_{RB}^{DL} \times 2$ complex-valued | $3 \times (N_{RB}^{DL} - 1) \times 2$ complex-valued | |
| Summing up in Eq. (7) | | $2 \times 3$ real-valued | |
| Arctan computation | | | Division and Look-Up Table (LUT) for arctan |

Subsequently, the second index $i_2$ is determined according to the determining step 306. The first index $i_1$ specifies $\beta_{mean}$. The precoder is determined out of the subset of precoders associated to the specified first index $i_1$.

The second variant is described. The second variant is of higher numerical complexity and more accurate, since all summands of in the objective function in Eq. (7) are taken into account according to:

$$g(\beta) = \sum_{v=1}^{N-1} (\cos(v\beta)\bar{r}'_v + \sin(v\beta)\bar{r}''_v). \quad (11)$$

Moreover, the numerical complexity is decreased, if the Codebook Subset Restriction field (e.g., as specified by the base station 102) already excludes some candidates with respect to the first index $i_1$.

The first phase angle $\beta$ is discretized into $L=32$ elements, i.e., $g(\beta)$ is sampled within the range of $\beta=0, \ldots, 2\pi$ at a rate $\pi/16$. Matrices C and S of dimension $L \times (N-2)$ are defined to have elements given by $$C_{k,v-1} = \cos\left(\frac{vl}{L}\pi\right), \text{ and} \quad (12)$$

$$S_{k,v-1} = \sin\left(\frac{vl}{L}\pi\right).$$

Two column vectors $\bar{r}'$ and $\bar{r}''$ of length $N-1$ are defined as $$\bar{r}' = [\bar{r}'_1 \ldots \bar{r}'_{N-1}]^T, \text{ and}$$

$$\bar{r}'' = [\bar{r}''_1 \ldots \bar{r}''_{N-1}]^T. \quad (13)$$

Hence, the discretized function $g(\beta)$ can be expressed as a vector:

$$g = C\bar{r}' + S\bar{r}''. \quad (14)$$

The first index $i_1$ associated to $\beta_{max}$ corresponds to the index of the maximum value in the vector g.

The numerical complexity of the second variant is summarized in below table.

| Function | Multiplications | Additions | Specific Operations |
|---|---|---|---|
| Covariance matrix estimation | $(4+3+2+1) \times N_{RB}^{DL} \times 2$ complex-valued | $(4+3+2+1) \times (N_{RB}^{DL} - 1) \times 2$ complex-valued | |
| Summing up in Eq. (7) | | $2 \times (3+2+1)$ real-valued | |
| Matrix vector multiplication according to Eq. (14) | $32 \times 3 \times 2$ real-valued | $32 \times 2 \times 2$ | |
| Search for maximum in vector of size 32 | | | Tree search with complexity $O(\log_2(16))$ |

A second embodiment for the first objective function relates to a transmission on the channel 110 providing an arbitrary number of layers. While the second embodiment is described for 2 receive antennas 108, the technique can readily be applied to any other number of receive antennas 108.

The measuring unit 122 provides estimations for the coarse channel state, or filtered coarse channel state, $\hat{H}(k)$. The coarse channel states are computed by de-rotation, e.g., by multiplying the received signal with the complex-conjugate of the CSI-RS as sent. The filtering is applied to the coarse channel state for improving noise suppression.

The measuring unit 122 further provides a noise covariance, $$N = \begin{bmatrix} \sigma_{00} & \sigma_{01} \\ \sigma_{01}^* & \sigma_{11} \end{bmatrix},$$

of the noise n between the receive antennas 108.
The correlation matrix $\hat{R}$ is estimated according to $$\hat{R}(\hat{H}) = \frac{1}{N_{RB}^{DL}} \sum_{k=0}^{N_{RB}^{DL}-1} \hat{H}^H(k) N^{-1} \hat{H}(k). \quad (15)$$

The noise is present in the estimation of the coarse channel state, $\hat{H}(k)$, and is thus also present in the correlation matrix $\hat{R}$. The noise is removed from in the correlation matrix, R, e.g., according to:

$$R_{i,j} = \begin{cases} \hat{R}_{i,j}(\hat{H}) - \dfrac{2g(\sigma_{00}\sigma_{11} - R\{\sigma_{01}^2\})}{\sigma_{00}\sigma_{11} - |\sigma_{01}|^2} & \text{for } i = j \\ \hat{R}_{i,j}(\hat{H}) & \text{for } i \neq j \end{cases}$$

Herein, $g \in [0,1]$ is the ratio of residual noise variance in the estimation of the coarse channel state.

The objective for the second embodiment of the objective function is to maximize the Shannon Capacity, $$\log_2[\det(I + W^H R W)].$$

Since the logarithm is strictly monotonically increasing, maximizing the Shannon Capacity is equal to maximizing the first object function $$g(W,R) = \det(I + W^H R W). \quad (16)$$

Herein, w is a matrix representation of one of the precoders in the codebook 116.

Maximizing the first objective function in Eq. (16) according to the selecting step 304 yields a precoder $$W^* = \underset{\beta}{\mathrm{argmax}}[g(W, R)] = W^*(\hat{H}, N).$$

The precoder W* defines a subset including a predefined number of precoders (e.g., 6 neighboring precoders) out of the codebook. For the determination 306, the CQME 404 evaluates the second objective function with a higher temporal resolution compared to the evaluation of the first objective function for the selection 304. E.g., the CQME 404 evaluates the second objective function for each Resource Block 200 and for each of the selected precoders in the subset.

As has become apparent from above exemplary embodiments, at least some embodiments allow efficiently determining the precoder, e.g., even for a large codebook. The determined precoder can be indicated in a CSI report. The numerical effort for determining a precoder that is applicable for a radio transmission via a channel including two or more transmit antennas may be similar to the numerical effort necessary for determining a precoder for a radio transmission via a channel including one or two transmit antennas.

In the foregoing, principles, preferred embodiments and various modes of implementing the technique disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of determining a precoder for a radio transmission from a base station to a mobile device via a channel including two or more transmit antennas, the method comprising:
   measuring at least one of a channel state (H) of the channel and a channel noise characteristic (N) of the channel;
   computing, based on a first objective function and the measurement, a first parameter indicative of a coarse direction of emission corresponding to a subset of precoders in a codebook including a plurality of precoders parametrized by the first parameter and a second parameter;
   selecting, based on the first parameter, the corresponding subset of precoders from the codebook;
   computing, based on a second objective function and the measurement, a second parameter that distinguishes different precoders in the subset; and
   determining, based on the second parameter, the precoder for precoding the transmission from the subset;
   wherein the first objective function is $g(\beta,R) = \Sigma_{m,n} r_{m,n} e^{j(m-n)\beta}$, where $\beta$ denotes the first parameter, and $r_{m,n}$ denotes a correlation between the transmit antennas or groups of the transmit antennas and depends on the result of the measurement.

2. The method of claim 1, wherein the first objective function is a quadratic function of the channel state (H).

3. The method of claim 1, wherein the first objective function is independent of the channel noise characteristic (N).

4. The method of claim 1, wherein the second objective function is a function of the result of the measurement and one of the precoders (W) out of the subset as candidates for the determination of the precoder.

5. The method of claim 1, wherein the precoder (W) is determined by evaluating the second objective function for each of the precoders in the selected subset, the determined precoder corresponding to an extremum of the evaluations.

6. The method of claim 1, further comprising reporting the determined precoder in a Channel State Information (CSI) report to the base station.

7. The method of claim 1, wherein the measurement is based on reference signals transmitted from the base station via the channel to the mobile device.

8. The method of claim 1 wherein the first parameter comprises a first phase angle $\beta$ relative to a plane normal to an antenna array including the two or more transmit antennas, and the second parameter comprises a second phase angle $\alpha$ relative to the coarse direction of emission indicated by the first phase angle.

9. The method of claim 8 wherein the first phase angle $\beta$ comprises a phase angle resulting from a superposition of the precoders in the subset.

10. The method of claim 1 wherein the transmit antennas comprise a linear array of cross polarized antennas.

11. The method of claim 10 wherein the first parameter comprises a first phase angle $\beta$ normal to a plane of an antenna array including the two or more transmit antennas, and the second parameter comprises a second phase angle $\alpha$ indicative of a combination of cross-polarization components.

12. A method of determining a precoder for a radio transmission from a base station to a mobile device via a channel including two or more transmit antennas, the method comprising:
   measuring at least one of a channel state (H) of the channel and a channel noise characteristic (N) of the channel;
   computing, based on a first objective function and the measurement, a first parameter indicative of a coarse direction of emission corresponding to a subset of precoders in a codebook including a plurality of precoders parametrized by the first parameter and a second parameter;

selecting, based on the first parameter, the corresponding subset of precoders from the codebook;
computing, based on a second objective function and the measurement, a second parameter that distinguishes different precoders in the subset; and
determining, based on the second parameter, a precoder for precoding the transmission from the subset;
wherein the first objective function is $g(W,R)=\det(I+W^H R W)$, W denotes a precoder out of the codebook as a candidate precoder for the subset, R denotes a relation between the transmit antennas or groups of the transmit antennas and depends on the result of the measurement, and I is a unity matrix.

13. The method of claim 12:
wherein the relation R is computed according to $R=H^H N^{-1} H$,
wherein the channel state is denoted by H and the channel noise characteristic is represented by a noise covariance denoted by N.

14. The method of claim 12, wherein a predefined number of the candidate precoders that correspond to the highest values of the first objective function are selected for the subset.

15. A computer program product stored in a non-transitory computer readable medium for determining a precoder for a radio transmission from a base station to a mobile device via a channel including two or more transmit antennas, the computer program product comprising software instructions which, when run one or more processing circuits of a computing device, causes the computing device to:
measure at least one of a channel state (H) of the channel and a channel noise characteristic (N) of the channel;
compute, based on a first objective function and the measurement, a first parameter indicative of a coarse direction of emission corresponding to a subset of precoders in a codebook including a plurality of precoders parametrized by the first parameter and a second parameter;
select, based on the first parameter, the corresponding subset of precoders from the codebook;
compute, based on a second objective function and the measurement, a second parameter that distinguishes different precoders in the subset; and
determine, based on the second parameter, a precoder for precoding the transmission from the subset;
wherein the first objective function is $g(\beta,R)=\Sigma_{m,n} r_{m,n} e^{j(m-n)\beta}$, where $\beta$ denotes the first parameter, and $r_{m,n}$ denotes a correlation between the transmit antennas or groups of the transmit antennas and depends on the result of the measurement.

16. A mobile device comprising an apparatus for determining a precoder for a radio transmission from a base station via a channel including two or more transmit antennas, the apparatus comprising:
a processing circuit;
memory containing instructions executable by the processing circuitry whereby the mobile device is operative to:
measure at least one of a channel state (H) of the channel and a channel noise characteristic (N) of the channel;
compute, based on a first objective function and the measurement, a first parameter indicative of a coarse direction of emission corresponding to a subset of precoders in a codebook including a plurality of precoders parametrized by the first parameter and a second parameter;
select, based on the first parameter, the corresponding subset of precoders from the codebook;
compute, based on a second objective function and the measurement, a second parameter that distinguishes different precoders in the subset; and
determine, based on the second parameter, a precoder for precoding the transmission from the subset;
wherein the first objective function is $g(\beta,R)=\Sigma_{m,n} r_{m,n} e^{j(m-n)\beta}$, where $\beta$ denotes the first parameter, and $r_{m,n}$ denotes a correlation between the transmit antennas or groups of the transmit antennas and depends on the result of the measurement.

17. The mobile device of claim 16 wherein the first parameter comprises a first phase angle $\beta$ relative to a plane normal to an antenna array including the two or more transmit antennas, and the second parameter comprises a second phase angle $\alpha$ relative to the coarse direction of emission indicated by the phase angle.

18. The mobile device of claim 17 wherein the first phase angle $\beta$ comprises a phase angle resulting from a superposition of the precoders in the subset.

19. The mobile device of claim 16 wherein the transmit antennas comprise a linear array of cross polarized antennas.

20. The mobile device of claim 19 wherein the first parameter comprises a first phase angle $\beta$ normal to a plane of an antenna array including the two or more transmit antennas, and the second parameter comprises a second phase angle $\alpha$ indicative of a combination of cross-polarization components.

* * * * *